US008767546B2

(12) United States Patent
Nguyen et al.

(10) Patent No.: US 8,767,546 B2
(45) Date of Patent: Jul. 1, 2014

(54) TRAFFIC LOAD AND TRANSMISSION RETRY MANAGEMENT

(75) Inventors: Viet-Hung Nguyen, Saint-Mande (FR); Hartman Van Wyk, Montloius sur Loire (FR)

(73) Assignee: Itron, Inc., Liberty Lake, WA (US)

( * ) Notice: Subject to any disclaimer, the term of this patent is extended or adjusted under 35 U.S.C. 154(b) by 79 days.

(21) Appl. No.: 13/445,682

(22) Filed: Apr. 12, 2012

(65) Prior Publication Data

US 2013/0235721 A1    Sep. 12, 2013

Related U.S. Application Data

(63) Continuation of application No. PCT/US2012/031600, filed on Mar. 30, 2012.

(30) Foreign Application Priority Data

Mar. 6, 2012 (EP) .................................... 12158320

(51) Int. Cl.
*H04J 3/14*     (2006.01)
*H04W 4/00*   (2009.01)
*H04L 12/413*  (2006.01)

(52) U.S. Cl.
USPC ............ 370/232; 370/235; 370/329; 370/445

(58) Field of Classification Search
USPC .................. 370/229, 230, 232, 235, 329, 445
See application file for complete search history.

(56) References Cited

U.S. PATENT DOCUMENTS

| | | | |
|---|---|---|---|
| 7,558,289 B1 | 7/2009 | Bidichandani et al. | |
| 2002/0054574 A1* | 5/2002 | Beach et al. ................... | 370/279 |
| 2002/0163933 A1* | 11/2002 | Benveniste ................... | 370/465 |
| 2003/0053469 A1* | 3/2003 | Wentink ......................... | 370/412 |
| 2003/0103521 A1* | 6/2003 | Raphaeli et al. ............... | 370/445 |
| 2005/0003794 A1* | 1/2005 | Liu ................................. | 455/355 |
| 2005/0070317 A1* | 3/2005 | Liu ................................. | 455/502 |
| 2005/0100040 A1* | 5/2005 | Guo et al. ...................... | 370/445 |

(Continued)

FOREIGN PATENT DOCUMENTS

WO    WO 2006074382 A1 *  7/2006

OTHER PUBLICATIONS

Nafaa et al., SCW: Sliding Contention Window for Efficient Service Differentiation in IEEE 802.11 Networks, Mar. 13-17, 2005, IEEE, Wireless Communications and Networking Conference (WCNC), pp. 1-6 (1626-1631).*

(Continued)

*Primary Examiner* — Noel Beharry
*Assistant Examiner* — Joe Combs
(74) *Attorney, Agent, or Firm* — Lee & Hayes, PLLC

(57) ABSTRACT

In a wireless network environment, techniques for traffic load management and transmission retry management assist a node to regulate network bandwidth consumed by one or more applications operating on the node, and assist the node to retransmit failed packets. Each of several software applications operating on the node may be prioritized. The prioritized applications will each receive a contention window appropriate to the priority of the application, which enforces an amount of bandwidth available to the application. In the event that a packet sent by the node fails to be acknowledged by a recipient, a retry algorithm may be utilized. The retry algorithm may use input including link quality and traffic density to adjust or maintain the contention window and/or retry count.

13 Claims, 7 Drawing Sheets

(56) References Cited

U.S. PATENT DOCUMENTS

| | | |
|---|---|---|
| 2005/0122902 A1 | 6/2005 | Guo et al. |
| 2005/0195772 A1* | 9/2005 | Nishikawa et al. ........... 370/337 |
| 2005/0271019 A1 | 12/2005 | Yuan et al. |
| 2006/0215686 A1* | 9/2006 | Takeuchi ...................... 370/445 |
| 2006/0258350 A1* | 11/2006 | Roy et al. ................... 455/435.1 |
| 2007/0025388 A1* | 2/2007 | Abhishek et al. ............. 370/447 |
| 2007/0049239 A1* | 3/2007 | Joung et al. ................ 455/343.1 |
| 2008/0171550 A1* | 7/2008 | Zhao ............................. 455/445 |
| 2008/0212604 A1 | 9/2008 | Liu |
| 2008/0279210 A1* | 11/2008 | Naka et al. ................... 370/448 |
| 2009/0097456 A1* | 4/2009 | Zhu et al. ..................... 370/336 |
| 2009/0154353 A1* | 6/2009 | Loiacono et al. ............ 370/235 |
| 2009/0185548 A1* | 7/2009 | Pratapagiri .................. 370/346 |
| 2009/0196306 A1* | 8/2009 | King et al. ................... 370/462 |
| 2009/0213731 A1* | 8/2009 | Bhasin et al. ................ 370/230 |
| 2009/0303888 A1* | 12/2009 | Ariyur et al. ................. 370/252 |
| 2010/0034091 A1 | 2/2010 | Hiertz et al. |
| 2010/0074263 A1 | 3/2010 | Bry et al. |
| 2010/0131815 A1* | 5/2010 | Benveniste .................. 714/749 |
| 2010/0195601 A1* | 8/2010 | Zhang .......................... 370/329 |
| 2011/0019721 A1* | 1/2011 | Diener et al. ................. 375/219 |
| 2011/0087944 A1* | 4/2011 | Li et al. ........................ 714/748 |
| 2011/0134865 A1* | 6/2011 | Gaur ............................. 370/329 |
| 2011/0149723 A1* | 6/2011 | Gong et al. .................. 370/216 |
| 2011/0149881 A1* | 6/2011 | Gong et al. .................. 370/329 |
| 2011/0182171 A1* | 7/2011 | McNew et al. .............. 370/216 |
| 2011/0268012 A1* | 11/2011 | Jo et al. ........................ 370/312 |
| 2012/0106371 A1* | 5/2012 | Abraham et al. ............. 370/252 |
| 2012/0314694 A1* | 12/2012 | Hsieh ............................ 370/338 |
| 2013/0195106 A1* | 8/2013 | Calmon et al. ............... 370/389 |

OTHER PUBLICATIONS

Nafaa, et al., "SCW: Sliding Contention Window for Efficient Service Differentiation in IEEE 802.11 Networks", Wirelss Communications and Networking Conference, 2005, New Orleans, LA, USA, Mar. 13-17, 2005, IEEE vol. 3, pp. 1626-1631.

The Extended European Search Report mailed May 29, 2012 for European patent application No. 12158320.7, 7 pages.

The PCT Search Report mailed Jan. 29, 2013 for PCT application No. PCT/US12/31600, 10 pages.

* cited by examiner

| APPLICATION 208 | ORIGINAL CW 302 | RESIZED CW 308 |
| --- | --- | --- |
| APPLICATION 210 | ORIGINAL CW 304 | RESIZED CW 310 |
| APPLICATION 212 | ORIGINAL CW 306 | RESIZED CW 312 |

FIG. 3

| LINK QUALITY | TRAFFIC DENSITY | CW SIZING DECISION |
| --- | --- | --- |
| GOOD | LOW | CW UNCHANGED |
| GOOD | HIGH | CW DOUBLED |
| BAD | LOW | CW UNCHANGED |
| BAD | HIGH | CW DOUBLED, S(L)RCMAX REDUCED |

FIG. 4

TRAFFIC LOAD AND TRANSMISSION RETRY MANAGEMENT

CROSS REFERENCE TO RELATED APPLICATIONS

This application claims priority to European Patent Application No. 12158320.7, filed Mar. 6, 2012, and entitled "Traffic Load and Transmission Retry Management," which is incorporated herein by reference. This application also claims priority to PCT application PCT/US12/31600, filed Mar. 30, 2012, and entitled "Traffic Load and Transmission Retry Management," which is incorporated herein by reference.

BACKGROUND

A mesh network may include a plurality of nodes, many of which may include one or more software applications producing and/or gathering data for transmission. Some of the software applications may be in communication with devices, including sensors, meters, etc., which may gather data. Collectively, the nodes may generate a considerable amount of data to be sent upstream to a root node for transmission to a central office.

Existing networks and systems may allow some applications to overwhelm portions of the network, and particularly to create bottle necks at certain upstream nodes. In some circumstances, this may result in transmission delays and quality of service issues.

Conventional contention window management fails to address this problem. Moreover, current technology fails to distinguish transmission failures due to traffic collisions from failures due to poor link connections, such as those caused by radio interference. Under such conditions, the routine doubling of contention windows, as indicated by some algorithms, may be counterproductive and may actually degrade network performance.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 3 is a table showing examples of a plurality of applications, original contention windows assigned to the plurality of applications and resized contention windows that may be set in the event of a transmission error.

FIG. 4 is a table showing an example of a relationship between link quality, traffic density and a decision regarding contention window resizing.

DETAILED DESCRIPTION

Overview

Figure 1:
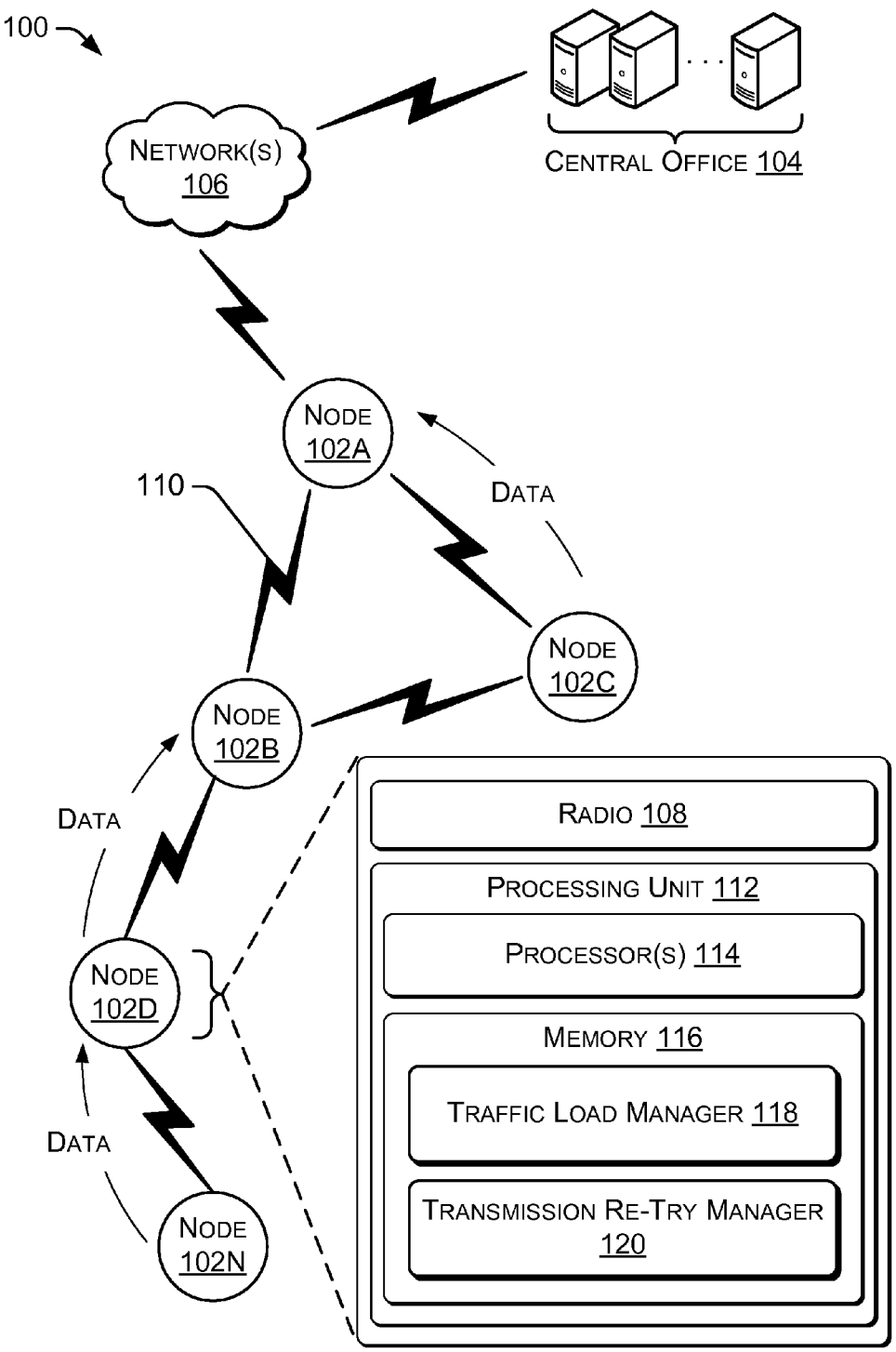
FIG. 1 is a diagram showing an example network having a plurality of nodes, some detail of one example node, a connection to a further network such as the Internet, and a central office.

As discussed above, existing networks do not provide an effective way of managing data transmission rates by applications, and may allow excessive data transmissions by particular nodes or particular applications to slow down portions of a network. Additionally, in the event of a transmission failure, existing transmission retry algorithms may manage contention windows in an inefficient manner. In particular, existing networks may fail to distinguish between transmission failures due to traffic collisions and transmission failures due to poor link connections, such as those caused by radio interference. In that case, adjustment of contention window(s) in response to existing routing metrics may exacerbate these problems and degrade network performance.

This disclosure describes techniques for providing network load management and an RF transmission retry algorithm. Network load management may include techniques to size contention windows associated with one or more applications based in part on a calculation that enforces bandwidth constraints on transmission of data by the one or more applications. RF transmission retry management may include an algorithm and/or techniques to resize contention windows based in part on input including representations of link quality (e.g., a level of RF interference) and traffic density (e.g., a level of local RF transmissions).

The techniques described herein may be adapted for use on any type of network. By way of example and not limitation, the network may include nodes implemented as smart utility meters (e.g., electric, gas, and/or water meters), sensors (e.g., temperature sensors, weather stations, frequency sensors, etc.), control devices, transformers, routers, servers, relays (e.g., cellular relays), switches, valves, and other network devices and the data generated and/or transmitted from any of the preceding. A root node may be identified within an autonomous routing area (ARA) of utility smart meters, and may be configured for transmission of data over a further network for transport to a central office. For example, the root node may be configured as a cellular router within a context of an autonomous routing area (ARA) of utility smart meters, may receive data from the mesh network, and may transmit that data to servers within the Internet for transfer to a central office, server or other desired location.

By way of example and not limitation, network load may be managed in part by regulating an amount of network bandwidth available to one or more nodes and/or applications operating on one or more nodes. For example, the amount of bandwidth may be controlled in part by sizing and controlling contention windows for each node or for each of the several applications according to a relative priority of each node and/or application. The term "contention window" may refer to a period of time that a node must wait, after transmission on a channel is ended by another node, and before the node may begin its own transmission. If another node begins transmission prior to the end of the node's contention window, the node must suspend a countdown associated with its own contention window, and let the other node use the channel. Management of the contention window associated with each application is an effective means to regulate network bandwidth assigned to the application. For example, when transmission on a channel stops (i.e., when no radio frequency (RF) signal is presently heard) applications desiring to begin transmission must each wait until expiration of their own contention windows. An application having a shortest contention window is able to start transmission first, thereby preventing other applications and/or nodes from transmitting. Accordingly, length of a contention window is a factor governing traffic on an RF network, such as a mesh network comprising a plurality of nodes, which may be configured as an ARA of utility smart meters, for example.

As another example, and again without limitation, RF transmission retry management may include an algorithm and/or techniques to resize contention windows based in part on inputs including a measure of link quality (e.g., RF transmission clarity between nodes) and a measure of traffic density (e.g., a percentage of time a channel is busy with RF transmissions). In particular, retry management provides techniques for retransmission of data and/or packets after a previous transmission has failed. Additionally, the techniques may assist in distinguishing between transmission failures due to traffic collisions and link quality issues. In one example, if link quality is good, then a contention window (e.g., associated with a node and/or an application running on the node) may be doubled if the traffic density is high, but not if it is low. Additionally, if link quality is bad, then a contention window may be doubled if the traffic density is high, but not if it is low. Accordingly, retry management techniques distinguish circumstances wherein bad link quality is interpreted as high traffic density, resulting in an inadvisable and/or unwarranted doubling of a contention window.

The discussion herein includes several sections. Each section is intended to be non-limiting. More particularly, this entire description is intended to illustrate components which may be utilized in network and/or traffic load management (e.g., techniques to regulate network bandwidth used by particular applications and/or particular nodes) and transmission retry management (e.g. techniques regulate contention window sizing after a transmission failure), but not components which are necessarily required. The discussion begins with a section entitled "Example Network Architecture," which describes an ARA, including smart utility meters and other devices as a representative environment that may implement the techniques described herein. Next, a section entitled "Example Node Configuration" illustrates and describes an example configuration of a processing unit in a node usable in a network such as an ARA and which provides network/traffic load management and transmission retry management in the event of a transmission failure. A further section, entitled "Example Methods" illustrates and describes techniques that may be used to regulate an amount of network bandwidth available to each of several applications operating on one or more nodes, and also techniques for retry management involving contention window resizing based in part on input including link quality and traffic density. Finally, the discussion ends with a brief conclusion.

This brief introduction, including section titles and corresponding summaries, is provided for the reader's convenience and is not intended to describe and/or limit the scope of the claims or any section of this disclosure.

Example Network Architecture

FIG. 1 is a schematic diagram showing an example network architecture 100 having a plurality of nodes, example detail of one node, a connection to a further network such as the Internet, and a central office. The network is configured for network/traffic load management and RF transmission retry management, according to prescribed techniques described herein. In particular, the network includes one or more nodes configured for network load management that may utilize contention window management to regulate an amount of bandwidth that one or more applications is allowed to use by sizing a contention window for each of the one or more applications. Additionally, the network may include one or more nodes configured with an RF transmission retry algorithm that may resize one or more of the contention windows of the nodes and/or applications. The resizing may be based in part on input that distinguishes traffic collisions from transmission failures due to RF link quality.

The architecture 100 may include a plurality of nodes 102A, 102B, 102C, 102D, ... 102N (collectively referred to as nodes 102) communicatively coupled to each other via direct communication radio frequency (RF) signals, transmissions or links In this example, N represents an example number of nodes in an autonomous routing area (ARA), which may be configured as a wide area network (WAN), metropolitan area network (MAN), local area network (LAN), neighborhood area network (NAN), personal area network (PAN), or the like.

In a multichannel environment, each of the plurality of channels may be defined by a frequency range which is the same or different for each of the plurality of channels, and each channel may be centered about a different frequency. In some instances, the plurality of channels comprises RF channels, typically having a frequency width appropriate to an anticipated modulation and environmental condition(s). The plurality of channels may comprise a control channel and multiple data channels. In some instances, the control channel is utilized for communicating one or more short messages between nodes to specify one of the data channels to be utilized to transfer data. Additionally, the control channel may be utilized by a plurality of nodes to transmit information indicating their contention window length. The length of the contention window may be expressed as a period of time, a number of time "slots," or any other agreed upon technique. Generally, transmissions on the control channel are shorter relative to transmissions on the data channels.

In the example of FIG. 1, the nodes 102 are also configured to communicate with a central office 104 via a root node, such as an edge device (e.g., cellular relay, cellular router, edge router, DODAG root, etc.), that serves as a connection point of the ARA to a backhaul network(s) 106, such as the Internet or an intranet. The central office 104 may be implemented by one or more computing devices, such as servers, personal computers, laptop computers, etc. The one or more computing devices may be equipped with one or more processor(s) communicatively coupled to memory. In some examples, the central office 104 includes a centralized meter data management system which performs processing, analysis, storage, and/or management of data received from one or more of the nodes 102. For instance, the central office 104 may process, analyze, store, and/or manage data obtained from a smart utility meter, sensor, control device, router, regulator, server, relay, switch, valve, and/or other nodes. Although the example of FIG. 1 illustrates the central office 104 in a single location, in some examples the central office may be distributed amongst multiple locations and/or may be eliminated entirely (e.g., in the case of a highly decentralized distributed computing platform).

The network(s) 106 may comprise a wireless or a wired network, or a combination thereof, and may be a collection of individual networks interconnected with each other and functioning as a single large network. In the illustrated example, the node 102A serves as a root node, configured as a cellular relay to relay communications to and/or from the other nodes 102B-102N of the ARA to and/or from the central office 104 via the network(s) 106.

The node 102D may be representative of each of the nodes 102 and includes a radio 108, configured for communication by means of RF signals 110, and a processing unit 112. The radio 108 comprises a radio frequency (RF) transceiver configured to transmit and/or receive RF signals via one or more of a plurality of channels/frequencies. In some implementations, each of the nodes may be configured for wired or wireless communication. By way of example and not limitation, wired communications may include power line communications (PCL) or other wired communication network technologies, such as Ethernet. In one example of a wireless implementation, the node 102 may include a single radio 108 configured to send and receive data on multiple different channels, such as the control channel and multiple data channels of each communication link 110. The radio 108 may also be configured to implement a plurality of different modulation techniques, data rates, protocols, signal strengths, and/or power levels. Additionally, the radio may be configured to sequentially tune a plurality of different frequencies, each for a short period of time, in a "frequency hopping" scheme. The architecture 100 may represent a heterogeneous network of nodes, in that the nodes 102 may include different types of nodes (e.g., smart meters, cellular relays, sensors, etc.), different generations or models of nodes, and/or nodes that otherwise are capable transmitting on different channels and using different modulation techniques, data rates, protocols, signal strengths, and/or power levels.

The processing unit 112 may include one or more processors 114 communicatively coupled to memory 116. The processor(s) 114 may execute, and the memory 116 may contain, various modules, managers, algorithms, etc. The modules may be configured in software and/or firmware, and may be executable by the processor(s) 114. In alternative embodiments, any or all of the modules may be implemented in whole or in part by hardware. Examples of hardware include a microcontroller or other digital device, such as an application specific integrated circuit (ASIC) or other device configured to execute the described functions.

The memory 116, while shown as a monolithic entity, may also be configured as a plurality of similarly and/or differently configured devices, such as read-only memory, writable memory, persistent or non-persistent memory, etc. The memory 116 may be configured to store one or more software and/or firmware modules, which are executable by the processor(s) 114 to implement various functions.

The memory 116 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented according to any technology or techniques for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

A traffic load manager 118 may include processor-executable instructions defined in memory 116 and may be operated by actions of the processor(s) 114. In one aspect, the traffic load manager 118 may be configured to prioritize application(s) operating on the node according to a relative amount of network bandwidth to be assigned to each. As one arbitrary example, if three applications (e.g., software programs) are operating on the node (e.g., being executed by a processor), then the traffic load manager 118 may prioritize the applications to result in the three applications receiving 50%, 20% and 30% shares, respectively, of the available bandwidth. In other examples, each application may be apportioned all, none, or some portion of a node's total bandwidth. The available bandwidth may depend on network traffic density and/or activity, and the shares may be approximate.

The network load manager 118 may regulate and/or enforce the relative amount of network bandwidth available to each of a plurality of applications by assigning initial size(s) of contention window(s) to be used by each of the one or more applications on the node. (Note that the initial contention window sizes may be altered, in some instances, such as following a transmission error, periodically after a passage of a certain amount of time, in the event that a node or application thereof has not had an opportunity to transmit within a certain amount of time, etc.) Accordingly, applications having a higher network bandwidth priority are assigned shorter contention windows that give them an advantage in obtaining network access, while applications having lower priority are assigned longer contention windows that may cause them to wait until higher priority applications have completed their transmission of data and/or packets during times when the network is busy. Thus, the traffic load manager 118 is able to ensure the availability of network resources to high priority applications, and to prevent a low priority application from utilizing an overly large percentage of the bandwidth of the network.

A transmission retry manager 120 may include an RF transmission retry algorithm configured to govern RF transmission retries, which may be operated in the event of a transmission failure. In one example, the transmission retry manager 120 may gather data (e.g., regarding RF link quality between nodes and traffic density data in portions of the network) for use in the RF transmission retry algorithm. The RF transmission retry algorithm may use the gathered data to determine if contention window(s) should be changed (e.g., doubled) and/or if a short or long retry count (e.g., a number of allowed retry attempts) should be adjusted (e.g., reduced).

Example Node Configuration

Figure 2:
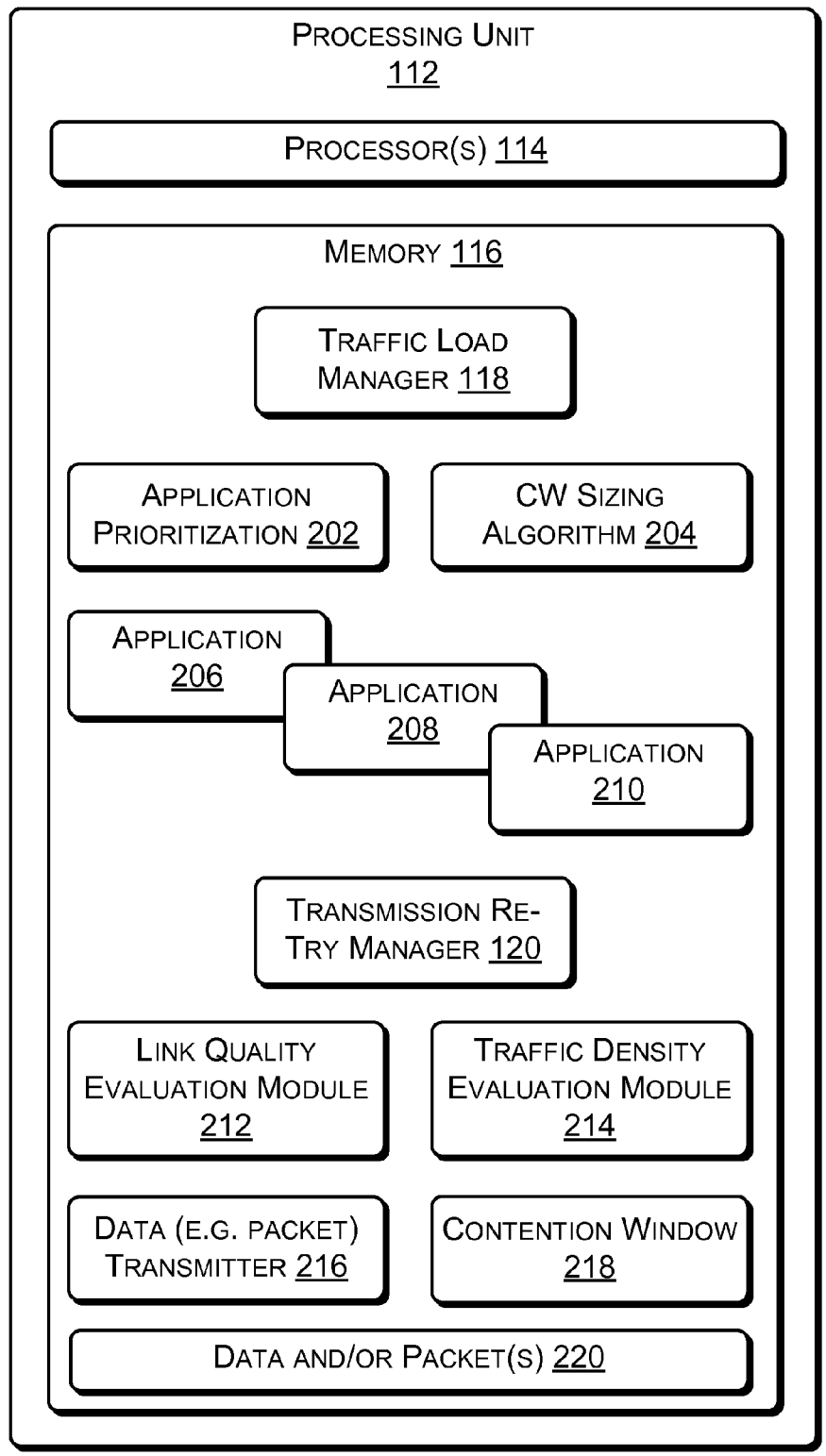
FIG. 2 is a diagram showing example detail of a processing unit of an individual node.

FIG. 2 is a diagram showing example detail of a processing unit 112 of an individual node. As discussed, the processing unit 112 may include processor(s) 114 and memory 116. As noted above, the traffic load manager 118 may be configured to manage and/or limit the timing and/or quantity of data and/or packets transmitted by a node and/or by individual applications on the node. In particular, the traffic load manager 118 may use information, including a priority of application(s) 206, 208, 210 operating on the node, to determine an amount (e.g., a relative amount) of network bandwidth that is appropriate for use by each of the plurality of applications operating on the node. In one example, one or more applications running on the node may be stand-alone applications. In a second example, one or more applications running on a node may be part of one or more distributed applications, i.e., applications having code executing on a plurality of nodes.

In one example, the traffic load manager 118 may be configured to calculate a size of a contention window for each application (e.g., applications, 206, 208, 210) operating on a node. Thus, a different contention window may be applied to a particular transmission of data, and the contention window may be based at least in part on which of the plurality of application(s) created data included within data to be transmitted. In a second example, the traffic load manager 118 may be configured to calculate a contention window size that will govern all transmissions made by the node. In a third example, the traffic load manager 118 may be configured to calculate contention windows based on a plurality of factors, including a current priority of an application that created data to be transmitted, a priority of that data (which may be based in part on age of the data, quantity of the data and/or demand for the data elsewhere on the network) and/or based on a network traffic level, etc.

An application prioritization module 202 may provide the traffic load manager 118 with a static and/or dynamic report of applications operating on the node, including their relative priority to the node, to the network and/or to the central office, etc. The priority of the applications will assist the traffic load manager 118 to determine which application has greater priority to transmit data. The priority may be based on the importance of the data produced by each, the time-sensitivity of that data, the quantity of that data and/or other factors. Thus, the application prioritization module 202 may be configured to prioritize the applications 206, 208, 210 stored and/or operating in the memory 116 of the node.

A contention window sizing algorithm 204 may be configured to calculate a size (i.e., a length and/or duration of time) of a contention window for each of applications (e.g., applications 206, 208, 210) on the node. Additionally and/or alternatively, the contention window sizing algorithm 204 may be configured to calculate a size of a contention window for the node, which may then be applied to transmission of data or instructions created by applications on the node. As noted above, the applications 206, 208, 210 may be stand-alone applications operating on the node, or the applications may be part(s) of distributed application(s) having executable code spread over a plurality of nodes.

A transmission retry manager 120 may govern aspects of transmission retries on a transmitting node. In particular, the transmission retry manager 120 may request or perform a transmission retry in response to a failure of transmitted data to be received and/or a failure of the transmitting node to receive an acknowledgement in response to a transmission.

In one aspect, the transmission retry manager 120 may resize a contention window (e.g., a contention window associated with an application) from an original size, set by the traffic load manager 118. The resized contention window may be longer than the original contention window. In one example, the traffic window may be resized due to heavy traffic density on one or more links 110 (e.g., portions of the network).

The transmission retry manager 120 may utilize data indicating an RF link quality between neighboring nodes and data indicating traffic density (e.g., frequency/time/duration/etc. of RF transmissions) in a local area of the network. The data may be used by the transmission retry manager 120 in an RF transmission retry algorithm. The RF transmission retry algorithm may use the gathered data to determine if contention window(s) should be changed (e.g., doubled) and/or if a short or long retry count (e.g., a number of allowed retry attempts) should be reduced. In one example, the contention window may be doubled for use on a first retry; however, in another example, the contention window may be double only on the second and subsequent retries.

A link quality evaluation module 212 may provide the transmission retry manager 120 with information about link quality over one or more network links (e.g., link 110 of FIG. 1). Link quality may be measured using existing link quality metrics, such as those available for data and/or packet routing purposes. Once measured, the link quality may be assigned a metric. The metric may be binary, such as good or bad, zero or one, etc. Alternatively, the metric may be more complex, and may show graduations of link quality that may reflect a more detailed and/or accurate measurement. Such an assignment may indicate a likelihood of an RF transmission failure due to interference or other problem.

A traffic density evaluation module 214 may provide the transmission retry manager 120 with information about levels of traffic density on over one or more wireless RF links in the network. The traffic density may be determined over a sliding window of time, such as by measuring time that node(s) are actively transmitting on the channel. In one example, the transmission retry manager 120 may assign a metric to the traffic density of RF transmissions over one or more network links as being either high or low. The metric may be binary, such as high traffic or low traffic, zero or one, etc. Alternatively, the metric may be more complex, and may show graduations of network traffic that may reflect a more detailed and/or accurate measurement. Such an assignment may indicate a likelihood of an RF transmission failure due to a collision with other transmission(s).

The transmission retry manager 120 may use the link quality metric from the quality evaluation module 212 and the traffic density or network activity level measure from the traffic density module 214 as input to a calculation. The calculation performed by the transmission retry manager 120 may establish sizes of one or more contention windows. Such contention windows may be associated with one or more applications, respectively, or the contention window may be associated with the node itself. For example, if link quality is good, then a contention window may be doubled if the traffic density is high, but not if it is low. As a further example, if link quality is bad, then a contention window may be doubled if the traffic density is high, but not if it is low.

In operation, the traffic load manager 118 may assist in network traffic management, including prioritizing transmission of a plurality of applications 206, 208, 210. The traffic load manager 118 may utilize input from an application prioritization module 202 to determine which applications should have greater or lesser priority to transmit. The traffic load manager 118 may utilize input from a contention window sizing algorithm 204 to create initial or original contention window sizes to enforce the transmission priority determined by the application prioritization module 202. Thus, data and/or a packet 220 may be transmitted by data transmitter 216 after waiting a period of time indicated by a contention window 218.

In some circumstances, transmission will fail and/or no acknowledgment of the transmission will be received. Under such circumstances, the transmission retry manager 120 may act to regulate aspects of the retransmission of the data 220. The retry manager 120 may receive input from the link quality evaluation module 212 and the traffic density evaluation module 214, and use that information to determine if the contention window 218 should be adjusted and/or the maximum retry count adjusted. According to the determination by the retry manager 120, the data 220 may be retransmitted by the transmitter 216.

FIG. 3 is a block diagram showing examples of original and resized contention windows assigned to applications 208, 210, 212. For example, the application 208 is assigned an original contention window 302. A length of the original contention window 302 may be sized to provide, limit and/or enforce a maximum quantity of network bandwidth available to the application 208 that is appropriate to its priority, perhaps relative to other applications. In one example, the original contention window 302 and/or its length may be assigned by the traffic load manager 118 discussed with respect to FIGS. 1 and 2, perhaps using input from an application prioritization algorithm 202 and/or the contention window sizing algorithm 204. Similarly, other applications 210 and 212 are assigned original contention window 304, 306 and having lengths appropriate to the priority of those applications and/or a bandwidth that is intended to be made available to each.

In some cases, a transmission will be unsuccessful, and a resized contention window may be utilized. This is particularly the case when the node identifies a high traffic situation on the network. It is also true when a node distinguishes a high traffic situation from transmission failure due to poor link quality (e.g., poor transmission environment). Thus, a resized contention window may be applied to a node and/or to applications operating within the node. In one example, the original contention window 302 associated with the application 208 may be resized to become a resized contention window 308. Typically, the resized contention window will be larger than the original contention window for any given application. In one example, the resized contention window 308 and/or its length may be assigned by the transmission retry manager 120 discussed with respect to FIGS. 1 and 2, perhaps using input from a link quality evaluation module 212 and/or the traffic density evaluation module 214. Similarly, the original contention window 304, 306 of the other applications 210 and 212 may become resized contention windows 310, 312 if transmission errors are detected.

FIG. 4 is a table showing an example of a relationship between link quality, traffic density and a decision regarding contention window resizing. In one example, the relationship is utilized by the transmission retry manager 120 of FIGS. 1 and/or 2. FIG. 4 shows a binary example illustrating "good" and "bad" link quality and "low" and "high" traffic density. In a further example, more graduations of one/both factor(s) could be utilized (e.g., good, medium, bad) and/or numeric examples could be used (e.g., quality=0.1; quality=0.2, etc.). In the example illustrated by FIG. 4, if the link quality is determined to be good and the traffic density is determined to be low, then a decision may be made to leave the contention window associated with a node, and/or an application operating on a node, unchanged. The link quality may be evaluated by the link quality evaluation module 212 and the traffic density may be evaluated by the traffic density evaluation module 214. The decision may be made by the transmission retry manager 120. Also indicated by the example of FIG. 4, good link quality and high traffic density may result in a doubling of the contention window, while bad link quality and low traffic density may result in an unchanged contention window. Further, bad link quality and high traffic density may result in a doubling of the contention window, along with a possible reduction of a short and/or long allowable retry count, i.e., a number of allowed retransmissions of a transmitted data.

Example Methods

The example methods of FIGS. 5-9 can be understood in part by reference to the configurations of FIGS. 1-4. However, FIGS. 5-9 contain general applicability, and are not limited by other drawing figures and/or prior discussion. Moreover, each method described herein is illustrated as a collection of acts, blocks or operations in a logical flow graph, which represent a sequence of operations that can be implemented in hardware, software, or a combination thereof. The methods may include storing, in a memory communicatively coupled to a processor, computer-executable instructions for performing a method, such as a method(s) of traffic load management and/or transmission retry management, and executing the instructions on the processor.

In the context of software, the operations represent computer-executable instructions stored on one or more computer-readable storage media that, when executed by one or more processors, perform the recited operations. Such storage media, processors and computer-readable instructions can be located within a system (e.g., node 102D of FIG. 1 or processing unit 112 of FIG. 2) according to a desired design or implementation. The storage media seen in FIGS. 1 and 2 is representative of storage media generally, both removable and non-removable, and of any technology. Thus, the recited operations represent actions, such as those described in FIGS. 5-9, and may be taken under control of one or more processors configured with executable instructions to perform the actions indicated. Generally, computer-executable instructions include routines, programs, objects, components, data structures, and the like that perform particular functions or implement particular abstract data types. The order in which the operations are described is not intended to be construed as a limitation, and the described operations may be combined in different orders and/or in parallel to implement the method(s). The above discussion may apply to other methods described herein.

Computer-readable media, computer storage media and/or memory include volatile and non-volatile, removable and non-removable media implemented according to any techniques or technology for storage of information such as computer-readable instructions, data structures, program modules, or other data. Computer-readable media includes, but is not limited to, random access memory (RAM), read only memory (ROM), electrically erasable programmable read only memory (EEPROM), flash memory or other memory technology, compact disk-read only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. Any such computer-readable media may be part of the system. Moreover, the computer-readable media may include computer-executable instructions that, when executed by the processor(s), perform various functions and/or operations described herein.

Additionally, for purposes herein, a computer-readable media may include all or part of an application specific integrated circuit (ASIC) or other hardware device. Such a hardware device may be configured to include other functionality, including functions that perform traffic load and retry management. Accordingly, within such an integrated circuit, one or more processors are configured with executable instructions, which may be defined by logic, transistors or other components, or on-board memory.

In contrast, communication media may embody computer-readable instructions, data structures, program modules, or other data in a modulated data signal, such as a carrier wave, or other transmission mechanism. As defined herein, computer-readable media does not include communication media.

Figure 5:
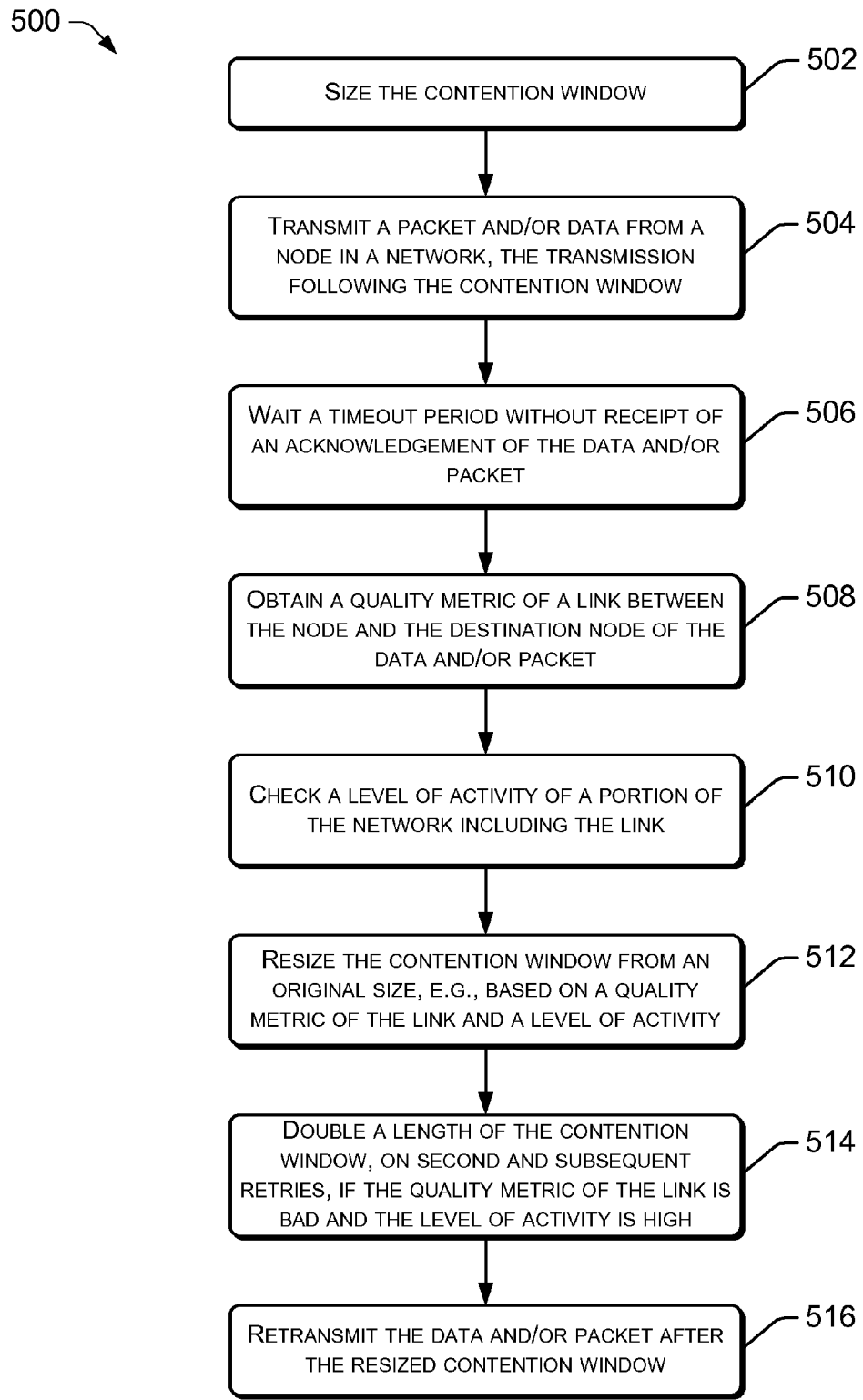
FIG. 5 is a flow diagram illustrating an example method by which network load management and retry (e.g., retransmission of an RF message) management may be performed.
Figure 6:
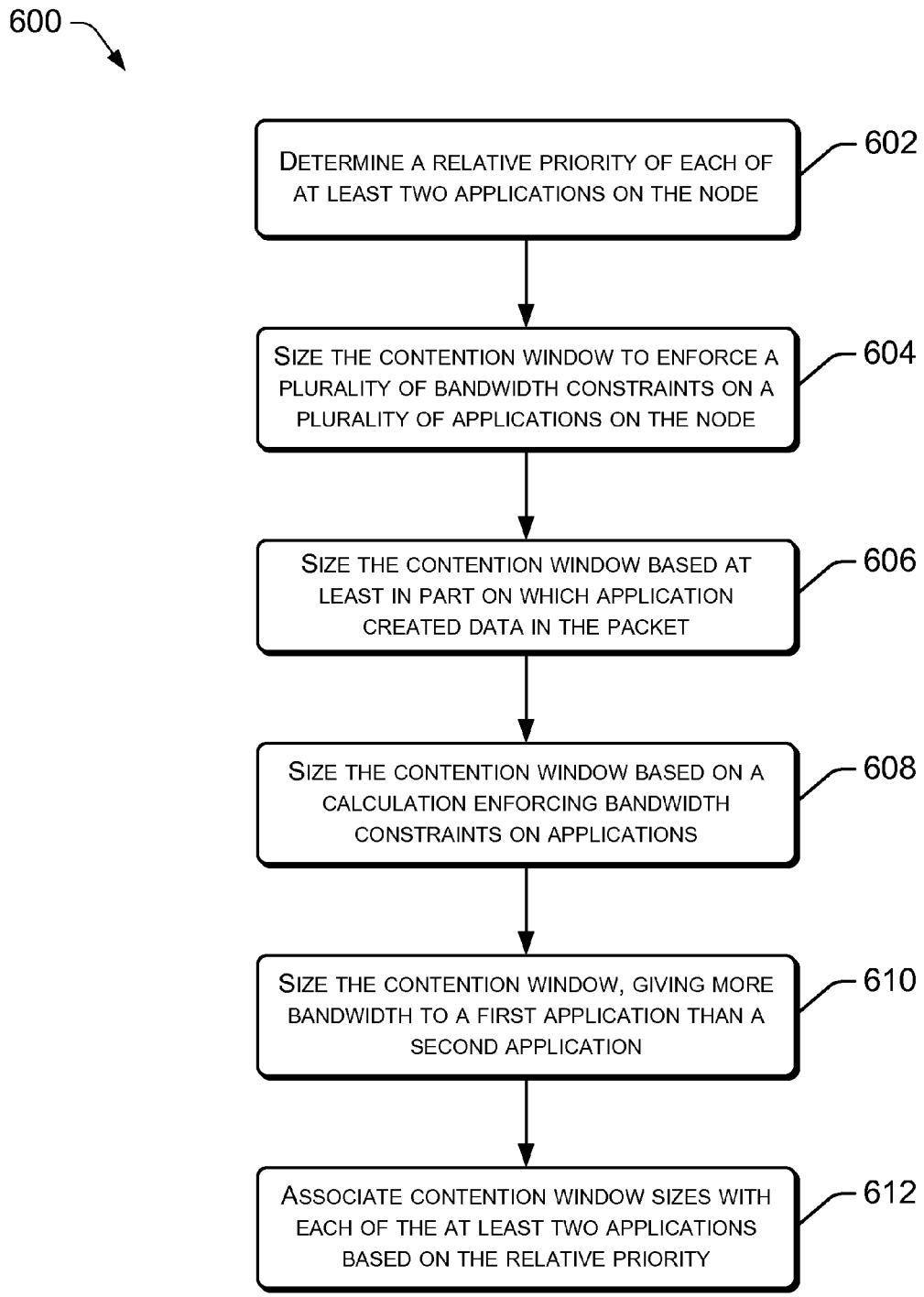
FIG. 6 is a flow diagram illustrating a plurality of example operations by which contention windows may be sized and network load management may be performed.

FIG. 5 is a flow diagram illustrating an example method 500 by which network load management and transmission retry management may be performed. At operation 502, a contention window is sized. The contention window may be set to an original or starting size according to a number of factors, such as to provide and/or enforce a maximum share or maximum bandwidth to be allowed an application and/or node to which the contention window is assigned. In the example of FIGS. 1 and 2, the contention window may be set according to the traffic load manager 118, which manages the selection of contention windows as a tool to manage traffic load on a network. FIG. 6 includes examples of techniques that may be used to size the contention window.

At operation 504, data and/or a packet is transmitted from a node in a network after a contention window elapses, i.e., the packet is transmitted following conclusion or expiration of the contention window. At operation 506, in the event of a packet transmission failure, the transmitting node may wait a timeout period without receipt of an acknowledgment of the transmitted packet. In view of the failure, a retry algorithm is entered. In the example of FIGS. 1 and 2, the transmission retry may be performed according to transmission retry manager 120, which manages transmission retries using link quality and traffic density information, and which transmits information that was not successfully transmitted on a first attempt.

At operation 508, a quality metric of a link, between the node and a destination node to which data was previously transmitted, is obtained. The quality metric may be used as an input to a retry algorithm, such as that performed by the transmission retry manager 120. In the example of FIG. 2, the quality metric may be obtained by the link quality evaluation module 212, which evaluates RF transmission quality, clarity, interference, etc.

At operation 510, a traffic density (e.g., a level of activity of a portion of the network or a link in the network) is checked. The traffic density may also be used as an input to a retry algorithm, such as that performed by the transmission retry manager 120. In the example of FIG. 2, the level of network activity may be obtained by the traffic density evaluation module 214, which evaluates traffic density over the network in the neighborhood in the indicated portion of the network.

At operation 512, the contention window may be resized from an original size to a sized indicated by a retry algorithm. In the example of FIGS. 1 and 2, the transmission retry manager 120 may provide such an algorithm. Such an algorithm may utilize one or both of the quality metric of the link and a level of activity or traffic density of the network, and may result in either no action or a doubling of the contention window. In one example, the quality metric of the link and the traffic density of the network may be binary, such as for example, a good or bad quality metric and a high or low level of traffic density. Alternatively, the quality metric and/or the traffic density may be expressed in a more finely graduated manner, such as a percentage of a range of possible traffic densities.

At operation 514, a length of the contention window is doubled, on second and subsequent retries, if the quality metric of the link is bad and the level of traffic density (network activity) is high. In a further example, the algorithm expressed by FIG. 4 is employed by the transmission retry manager 120 of FIG. 2, to assist indicate a wait before transmission of a failed packet. At operation 516, the packet for which an acknowledgment was not received (such as at operation 506) is retransmitted after expiration of the resized contention window.

FIG. 6 is a flow diagram 600 illustrating a plurality of example operations by which contention windows may be sized and network load management may be performed. Each of the example operations may be used singly or in combination with others of the example operations. At operation 602, priorities and/or relative priorities may be determined, for or between each of a plurality of applications on the node. In the example of FIG. 2, the application prioritization module 202 may determine the relative priority of a plurality of applications operating on a node. The priority can be used to determine how much network bandwidth should be given to each application, either absolute terms or relative to other applications. In particular, the priority may be used when network bandwidth is limited to a point where some rationing of network bandwidth is required and/or anticipated.

At operation 604, the contention window may be sized to enforce a plurality of bandwidth constraints on a plurality of applications on the node. By using the relative priorities of a plurality of applications, a plurality of contention windows may be sized to enforce appropriate relative bandwidth allotments on the plurality of applications.

At operation 606, the contention window may be sized based at least in part on which application created data in the packet. In a circumstance wherein a node is transmitting a packet, the node may calculate a contention window for use in the transmission based on which application created the packet.

At operation 608, the contention window may be sized based on a calculation enforcing bandwidth constraints on applications. Thus, a plurality of contention windows may be used to enforce a plurality of similar and/or different bandwidth constraints on a plurality of applications, nodes or other data and/or packet generating objects or devices, etc.

At operation 610, contention window sizes may be associated with each of the at least two applications based on the relative priority.

At operation 612, contention window sizes are associated with each of the at least two applications based on the relative priority. In the example of FIG. 2, the contention window sizing algorithm 204 may determine the sizes of each of a plurality of contention windows associated with each of the plurality of applications operating on a node, respectively. In a further example, when a plurality of applications is associated with a plurality of contention windows, a sequence of different packets, each associated with a different application, may be transmitted by a node after a sequence of differently sized contention windows.

Figure 7:
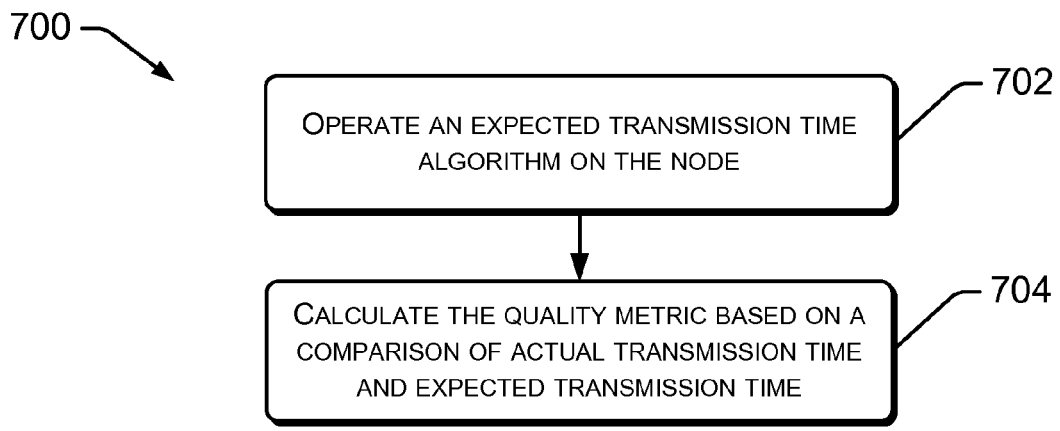
FIG. 7 is a flow diagram illustrating an example method by which a quality metric may be obtained, such as for use in resizing a contention window as part of retry management.

FIG. 7 is a flow diagram illustrating an example method 700 by which a quality metric may be obtained, such as for use in resizing a contention window as part of retry management. All or part of the example method may be performed by the transmission retry manager 120 of FIG. 2, in the course of retransmitting failed packets. At operation 702, an expected transmission time algorithm may be operated on the node. In the example of FIG. 2, the link quality evaluation module 212 may use the expected transmission time algorithm to create a baseline, to which to compare actual transmission times. At operation 704, the quality metric may be calculated based on a comparison of the expected transmission time and actual measured time of transmission. In the example of FIG. 2, the link quality evaluation module 212 may calculate the quality metric based on the comparison.

Figure 8:
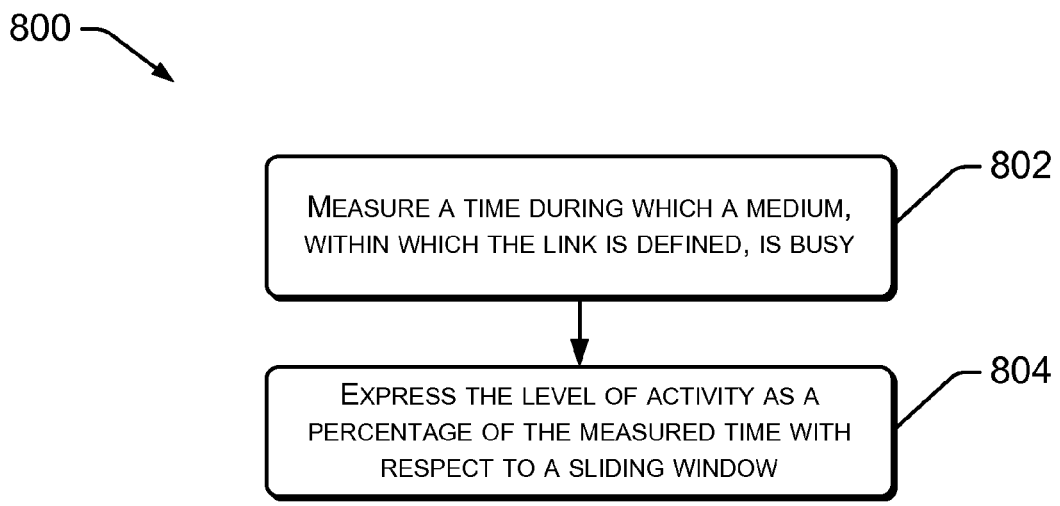
FIG. 8 is a flow diagram illustrating an example method by which network traffic density may be measured, such as for use in resizing a contention window as part of retry management.

FIG. 8 is a flow diagram illustrating an example method 800 by which traffic density and/or network activity may be measured, such as for use in resizing a contention window as part of retry (e.g., retransmission of an RF message) management. In the example of FIG. 2, the traffic density measurement and evaluation is performed by the traffic density evaluation module 214, which may employ the algorithm 800 or similar. At operation 802, a time is measured during which a medium, within which the link is defined, is busy. At operation 804, the level of activity (i.e., traffic density) may be expressed as a percentage of the measured time with respect to a sliding window. Thus, a percentage of the time the network, or a portion thereof, is busy, may be measured.

Figure 9:
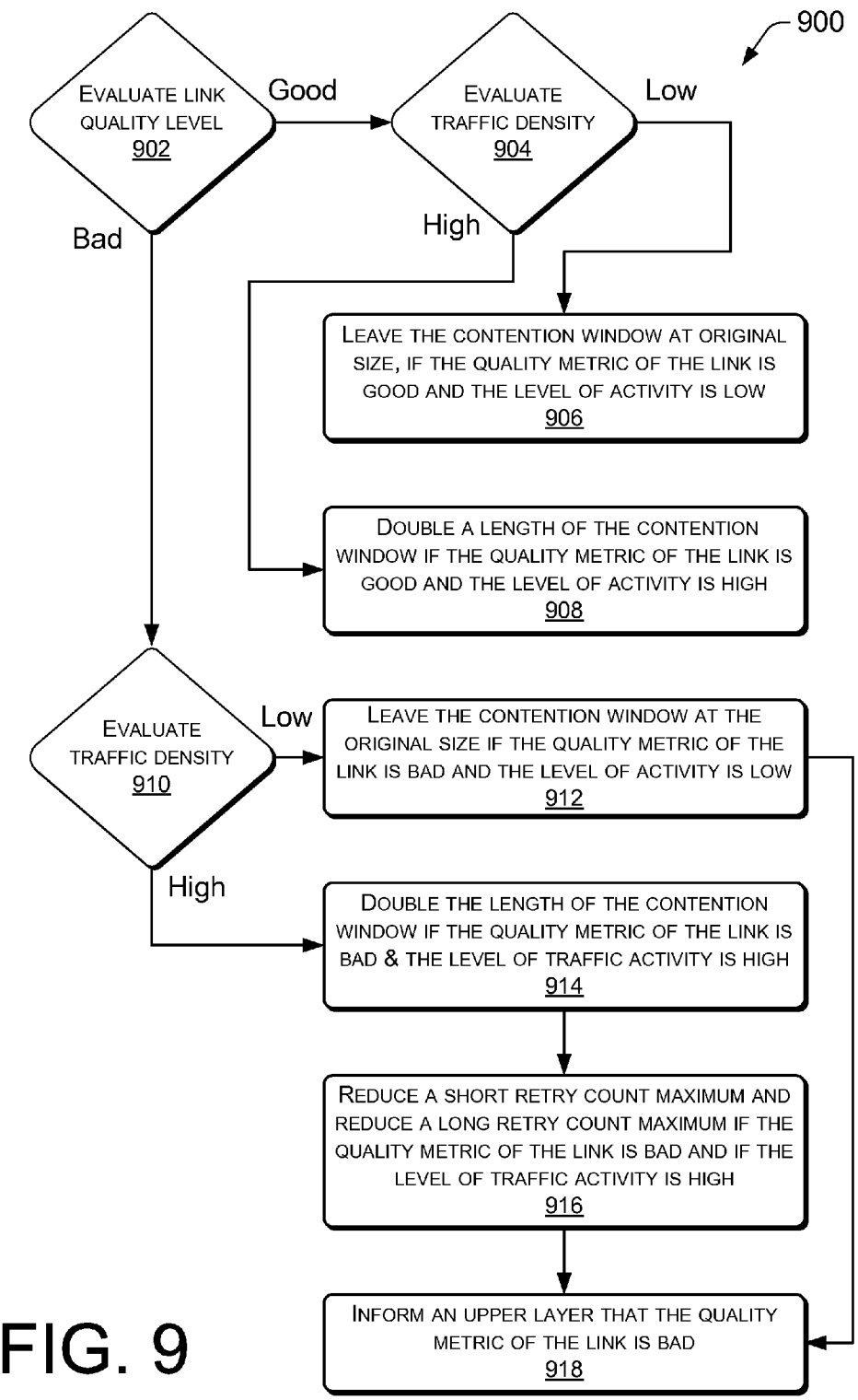
FIG. 9 is a flow diagram illustrating an example method by which resizing a contention window may be performed, as a technique in retry management.

FIG. 9 is a flow diagram illustrating an example method 900 by which resizing a contention window may be performed, as a technique in transmission retry management. In the example of FIG. 2, the transmission retry manager 120 may perform the method 900. At operation 902, the link quality is evaluated. The evaluation may include an assessment of the RF transmission quality between two nodes, over an RF "link." The assessment may include an evaluation of RF interference, RF obstructions, etc. In the example of FIG. 2, the evaluation may be performed by the link quality evaluation module 212. As indicted above, the evaluation of the link quality may be made in a granular method, and may be represented by a percentage or the like. In the example of FIG. 9, the link quality is evaluated in a binary manner and is represents as being either "good" or "bad," i.e., good or bad link quality. At operation 904, if the link quality is rated as "good," the traffic density is evaluated. In the example of FIG. 2, this may be performed by the traffic density evaluation module 214. As indicted above, the evaluation of the traffic density may be made in a granular method, and may be represented by a percentage or the like. In the example of FIG. 9, the traffic density is evaluated in a binary manner and is represents as being either "low" or "high," i.e., low traffic or high traffic density over one or more links or a portion of a network. At operation 906, the contention window is left at an original size (e.g., as determined by the traffic load manager 118 and/or contention window sizing algorithm 204, see FIG. 2), if the quality metric of the link is good and the level of traffic density is low. At operation 908, a length of the contention window may be doubled if the quality metric of the link is good and the level of traffic density is high.

At operation 910, if the link quality was evaluated as "bad," the traffic density is evaluated in a manner similar to operation 904. At operation 912, the contention window may be left at the original size if the quality metric of the link is bad and the level of traffic density is low. At operation 914, the length of the contention window may be doubled if the quality metric of the link is bad and the level of traffic density is high. At operation 916, under conditions similar to those of operation 914, a short retry count maximum and a long retry count maximum may be reduced if the quality metric of the link is bad and if the level of traffic density is high. This will generally reduce the number of transmission retries when success is unlikely.

At operation 918, an upper layer in a transmission protocol may be informed, if the quality metric of the link is bad.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A method, comprising:
associating a first contention window having a first size with a first application operating on a node in a network;
associating a second contention window having a second size with a second application operating on the node, wherein the first size is different from the second size, and wherein the first and second contention windows are based on priorities of the first and second applications;
transmitting a packet from the first application on the node in the network, the transmission following elapsing of the first contention window;
waiting a timeout period without receipt of an acknowledgement of the packet;
obtaining a quality metric of a link between the node and a destination node of the transmitted packet;
checking a traffic density of a portion of the network including the link;
reducing a short retry count maximum and a long retry count maximum if the quality metric is below a first threshold and the traffic density exceeds a second threshold;
informing an upper layer of a transmission protocol of the quality metric;
resizing the first contention window from the first size, the resizing based on input including the quality metric of the link and the traffic density, wherein resizing the first contention window comprises:
distinguishing between transmission failures due to traffic collisions and transmission failures due to link quality issues;
resizing the first contention window if transmission failures are due to traffic collisions; and
retransmitting the packet after the resized first contention window elapses.

2. The method of claim 1, wherein obtaining the quality metric of the link comprises:
operating an expected transmission time algorithm on the node; and
calculating the quality metric based on the expected transmission time algorithm.

3. The method of claim 1, wherein checking the traffic density comprises:
measuring a time during which a medium, within which the link is defined, is busy; and
expressing the traffic density as a percentage of the measured time during which the medium is busy.

4. The method of claim 1, wherein resizing the first contention window comprises doubling a length of the first contention window only on second and subsequent transmission retries, but not on a first transmission retry.

5. The method of claim 1, additionally comprising:
determining a priority of each of a plurality of applications on the node including the first and second applications; and
associating contention window sizes with each of the plurality of applications based on the priority of each of the plurality of applications;
wherein the first size of the first contention window is one of the contention window sizes associated with one of the applications.

6. The method of claim 1, additionally comprising:
sizing the first contention window to the first size based on a calculation enforcing a plurality of bandwidth constraints on a plurality of applications on the node, respectively.

7. The method of claim 1, additionally comprising:
sizing the first contention window to the first size based on a calculation giving more bandwidth to the first application than the second application.

8. A node of a network, comprising:
one or more processors;
memory, in communication with the one or more processors;
a plurality of applications, defined in the memory;
a traffic load manager, defined in the memory and executable by the one or more processors, wherein the traffic load manager is configured to:
 determine a priority of each of the plurality of applications; and
 associate each of the plurality of applications defined in the memory of the node with one of a plurality of contention windows, the associating performed according to a priority of each application, wherein different applications from among the plurality of applications that have different priority have contention windows of different sizes;
a transmission retry manager, defined in the memory and executable by the one or more processors, to resize a contention window, the contention window from among the plurality of contention windows and associated with an application from among the plurality of applications, according to inputs including a quality metric and a traffic density over a portion of the network, wherein resizing the contention window comprises:
 distinguishing between transmission failures due to traffic collisions and link quality;
 resizing the contention window if transmission failures are due to traffic collisions;
 reducing a short retry count maximum and reducing a long retry count maximum if the quality metric is below a first threshold and the traffic density exceeds a second threshold; and
 informing an upper layer of a transmission protocol of the quality metric; and
a packet transmitter, defined in the memory and executable by the one or more processors, to transmit the packet to a second node.

9. A method of operating a node of a network, comprising:
associating a first contention window having a first size with a first application operating on the node;
associating a second contention window having a second size with a second application operating on the node, wherein the first size is different from the second size, and wherein the first and second contention windows are based on priorities of the first and second applications;
obtaining a quality metric of a link between the node and a destination node of a packet to be transmitted by the first application and a packet to be transmitted from the second application;
checking a level of traffic density of a portion of the network including the link;
resizing the first and/or second contention windows based on input including the quality metric of the link and the level of traffic density, the resizing comprising:
 distinguishing between transmission failures due to the level of traffic density and the quality metric;
 resizing the first contention window if transmission failures are due to the level of traffic density;
 reducing a short retry count maximum and reducing a long retry count maximum if the quality metric is below a first threshold and the level of traffic density exceeds a second threshold; and
 informing an upper layer of a transmission protocol of the quality metric; and
transmitting the packet from the first application and the packet from the second application after the resized first and/or second contention windows elapse, respectively.

10. The method of claim 9, additionally comprising:
determining which of a plurality of applications operating on the node, including the first and second applications, created data to be transmitted; and
selecting the first and/or second contention window based at least in part on the determination.

11. The method of claim 9, additionally comprising:
prioritizing a plurality of applications running on the node; and
associating each of the plurality of applications, including the first and second applications, with a contention window sized at least in part based on priority of the application.

12. The method of claim 9, additionally comprising:
utilizing a plurality of differently sized contention windows in association with a plurality of different applications operating on the node, respectively, the plurality of different applications including the first and second applications, wherein the plurality of different applications have a plurality of different priorities, respectively.

13. The method of claim 9, wherein sizing the contention window comprises:
sizing a plurality of contention windows differently for transmission of data created by a plurality of different applications, respectively, the plurality of different applications including the first and second applications.

* * * * *